United States Patent Office 2,964,524
Patented Dec. 13, 1960

2,964,524

O,O,O,O-TETRAALKYL HEXAHYDRO-3,6-DIOXO-s-TETRAZIN-1,4-YLENE DIPHOSPHONOTHIOATE

Henry Tolkmith, Midland, Mich., assignor to The Dow Chemical Company, Midland, Mich., a corporation of Delaware No Drawing. Filed Oct. 28, 1959, Ser. No. 849,165

3 Claims. (Cl. 260—241)

The present invention is directed to O,O,O,O-tetraalkyl hexahydro-3,6-dioxo-s-tetrazin - 1,4 - ylene - diphosphonothioate

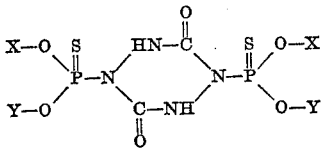

In this and succeeding formulae, X and Y represent lower alkyl. The expression "lower alkyl" is employed in the present specification and claims to refer to radicals containing from 1–5 carbon atoms, inclusive. These new compounds are liquid or crystalline solid materials which are somewhat soluble in many organic solvents and of very low solubility in water. They are useful as intermediates for the preparation of more complex phosphorus derivatives. The compounds are also useful as parasiticides and are adapted to be employed as active toxic constituents of compositions for the control of mite, insect and bacterial organisms such as flies, beetles, aphids and southern army worms.

The new compounds may be prepared by reacting a lower alkyl ester of chloroformic acid with an O,O-di(lower alkyl) phosphorohydrazidothioate having the formula

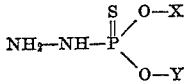

Suitable ester reagents include the methyl, ethyl, propyl, butyl, and amyl esters of chloroformic acid. The reaction is carried out in the presence of an alkaline reagent such as a tertiary amine and preferably in an inert organic liquid as reaction medium. Good results are obtained when employing substantially equimolecular proportions of the chloroformate, phosphorohydrazidothioate and alkaline reagents. The reaction is somewhat exothermic and takes place smoothly at temperatures of from 0° to 100° C. with the production of the desired product and chloride and lower alkanol of reaction. The chloride appears in the reaction mixture as the chloride of the alkaline reagent such as tertiary amine hydrochloride. The temperature may be controlled by regulating the rate of contacting the reagents and by external cooling.

In carrying out the reaction, the ester of chloroformic acid is added slowly portionwise to the phosphorohydrazidothioate reagent in the presence of the alkaline reagent. The contacting is carried out in the reaction solvent with stirring and at a temperature of from 0° to 100° C. Upon completion of the reaction, the reaction mixture may be washed with water to separate amine hydrochloride, and any reaction medium removed by evaporation to obtain the desired product as a residue. This product may be purified by conventional procedures such as recrystallization or extraction with suitable solvents.

The following examples merely illustrate the invention and are not to be construed as limiting.

*Example 1.—O,O,O,O-tetraethyl hexahydro-3,6-dioxo-s-tetrazin-1,4-ylene diphosphonothioate*

Ethyl chloroformate (87 grams; 0.8 mole) was dispersed in one liter of benzene and the resulting material added portionwise to a mixture containing 147 grams (0.8 mole) of O,O-diethyl phosphorohydrazidothioate and 83 grams (0.815 mole) of triethyl amine dispersed in 800 milliliters of benzene. The addition was carried out at a temperature of 5° C. with cooling and stirring over a period of 3 hours. During the reaction, a solid material precipitated in the reaction mixture. Upon completion of the reaction, the solid was removed by filtration and dissolved in 1.8 liters of ethanol. The solvent solution was then washed with water and any remaining ethanol removed from the washed product by evaporation to obtain an O,O,O,O-tetraethyl hexahydro-3,6-dioxo-s-tetrazin-1,4-ylene diphosphonothioate product as a crystalline residue. This product was recrystallized from a 1:1 mixture of methanol and ethanol and found to melt at 154°–155° C., and to contain nitrogen, phosphorus and sulfur contents of 13.8 percent, 14.57 percent and 14.85 percent, respectively, as compared to theoretical contents of 13.33 percent, 14.74 percent and 15.26 percent.

*Example 2.—O,O,O,O-tetramethyl hexahydro-3,6-dioxo-s-tetrazin-1,4-ylene diphosphonothioate*

Ethyl chloroformate (43.5 grams; 0.4 mole) was dispersed in 300 cc. of benzene and the resulting mixture added slowly portionwise to a mixture consisting of 62 grams (0.4 mole) of O,O-dimethyl phosphorohydrazidothioate and 0.41 mole of triethyl amine dispersed in 300 milliliters of benzene. The addition was carried out over a period of 3 hours and at a temperature of 25° C. with stirring. During the reaction, a solid material precipitated in the reaction mixture. Upon completion of the reaction, the solid was removed by filtration and dissolved in 1.8 liters of ethanol. The solvent solution was then washed with water and any remaining ethanol removed from the washed product by evaporation to obtain an O,O,O,O-tetramethyl hexahydro-3,6-dioxo-s-tetrazin-1,4-ylene diphosphonothioate product as a crystalline residue. This product was recrystallized from a 1:1 mixture of methanol and ethanol and found to melt at 201–202° C. and to contain nitrogen, phosphorus and sulfur contents of 15.66 percent, 17.25 percent and 17.65 percent, respectively, as compared to theoretical contents of 15.38 percent, 17.01 percent and 17.64 percent.

In a similar manner, other compounds of the present invention may be prepared as follows:

O,O,O,O-tetrabutyl hexahydro-3,6-dioxo-s-tetrazin-1,4-ylene diphosphonothioate by reacting methyl chloroformate with O,O-dibutyl phosphorohydrazidothioate in the presence of tributyl amine.

O,O'-dimethyl-O,O'-diamyl hexahydro-3,6-dioxo-s-tetrazin-1,4-ylene diphosphonothioate by reacting propyl chloroformate with O-methyl-O-amyl phosphorohydrazidothioate in the presence of triethylamine.

O,O'-dimethyl-O,O'-dipropyl hexahydro-3,6-dioxo-s-tetrazin-1,4-ylene diphosphonothioate by reacting ethyl chloroformate with O-methyl O-propyl phosphorohydrazidothioate in the presence of tripropyl amine.

O,O,O,O-tetrapropyl hexahydro-3,6-dioxo-s-tetrazin-1,4-ylene diphosphonothioate by reacting methyl chloroformate with O,O-dipropyl phosphorohydrazidothioate in the presence of triethyl amine.

The new compounds of the present invention are effective as parasiticides and are adapted to be employed for the control of many bacterial and insect organisms. For such use, the products may be dispersed on an inert finely divided solid and employed as dusts. Also, such mixtures may be dispersed in water with the aid of a surface active agent, and the resulting aqueous suspensions employed as sprays. In other procedures, the products may be employed as constituents of oil-in-water emulsions or water dispersions with or without the addition of surface active dispersing agents. In representative operations, substantially complete controls of two-spotted spider mites are obtained with aqueous compositions containing 500 parts by weight of O,O,O,O-tetramethyl hexahydro-3,6-dioxo-s-tetrazin-1,4-ylene diphosphonothioate per million parts by weight of ultimate composition.

The O,O-di(lower alkyl) phosphorohydrazidothioates employed as starting materials as herein described may be prepared in known methods by reacting hydrazine hydrate with a suitable O,O-di(lower alkyl) phosphorochloridothioate in the presence of an inert organic liquid as reaction medium. The reaction takes place smoothly at temperatures of from 0°–50° C. with the production of the desired product and hydrazine hydrochloride of reaction. Following the reaction, the desired product may be separated by conventional methods.

I claim:

1. The O,O,O,O-tetra(lower alkyl) hexahydro-3,6-dioxo-s-tetrazin-1,4-ylene diphosphonothioates.

2. O,O,O,O-tetraethyl hexahydro-3,6-dioxo-s-tetrazin-1,4-ylene diphosphonothioate.

3. O,O,O,O-tetramethyl hexahydro-3,6-dioxo-s-tetrazin-1,4-ylene diphosphonothioate.

No references cited.